United States Patent [19]

Tholen

[11] 4,236,492
[45] Dec. 2, 1980

[54] INTERNAL COMBUSTION ENGINE HAVING A SUPERCHARGER AND MEANS FOR COOLING CHARGED AIR

[75] Inventor: Paul Tholen, Im Lüh, Fed. Rep. of Germany

[73] Assignee: Klöckner-Humboltd-Deutz Aktiengesellschaft, Cologne, Fed. Rep. of Germany

[21] Appl. No.: 857,791

[22] Filed: Dec. 5, 1977

[30] Foreign Application Priority Data

Dec. 4, 1976 [DE]  Fed. Rep. of Germany ....... 2655017

[51] Int. Cl.³ .............................................. F02B 29/04
[52] U.S. Cl. ............................................ 123/119 CD
[58] Field of Search .................. 60/599; 123/119 CD

[56] References Cited

U.S. PATENT DOCUMENTS

| | | | |
|---|---|---|---|
| 2,372,272 | 3/1945 | Helmore | 123/119 CD |
| 2,748,562 | 6/1956 | Kauffmann | 60/599 |
| 3,162,998 | 12/1964 | Williams | 123/119 CD X |
| 3,336,911 | 8/1967 | Steiger | 60/599 X |
| 3,439,657 | 4/1969 | Gratzmuller | 60/599 X |
| 4,062,188 | 12/1977 | Cutler et al. | 123/119 CD X |

*Primary Examiner*—Michael Koczo
*Attorney, Agent, or Firm*—Becker & Becker, Inc.

[57] ABSTRACT

An internal combustion engine having a supercharger and two or more supercharger intercoolers or cooling systems respectively having different temperature levels. The individual coolers are arranged in succession in the direction of flow, with the charged air decreasing in temperature and the cooling air increasing in temperature.

10 Claims, 7 Drawing Figures

INTERNAL COMBUSTION ENGINE HAVING A SUPERCHARGER AND MEANS FOR COOLING CHARGED AIR

The present invention relates to an internal combustion engine having a supercharger and a supercharger intercooler system.

One possiblity for increasing the power of internal combustion engines and reducing the specific weight thereof consists in increasing the degree of supercharging. However, with high supercharging, the proportion of the quantity of heat to be carried off in the supercharger intercooler greatly increases. For example, starting with a 100% supercharged internal combustion engine, just increasing the quantity of air by 50% while doubling the pressure increase and recooling to about the same temperature, results in a tripling of the quantity of heat to be carried off. It is expensive to carry off this increased heat to the atmosphere by normal heat exchangers.

An internal combustion engine having a liquid cooled supercharger intercooler and an associated heat exchanger is known (Austrian Pat. No. 27 27 64). According to the teaching of this patent, the heat exchanger is arranged in the cooling air stream prior to two additional coolers or radiators, which are associated with cooling circuits having higher temperatures. With this known arrangement, however, the entire heat of the charged air is finally given off to the cooling air at a relatively low temperature level of the cooling water of about 60°-90° C. Due to the low cooling water temperature, the cooling air can only be heated up to about 50°-80° C. At a cooling air entry temperature of 30° C., a temperature difference $\Delta t$ between 20° and 50° C. results. With therelatively high heat content of the charged air at greater charging pressures, the radiators, the quantity of cooling air, and the ventilator capacity are disproportionately large.

It is an object of the present invention to be able to carry off a large quantity of heat at optimal construction cost and power consumption.

This object and other objects and advantages of the present invention will appear more clearly from the following specification in connection with the accompanying drawings, in which.

Figure 1:
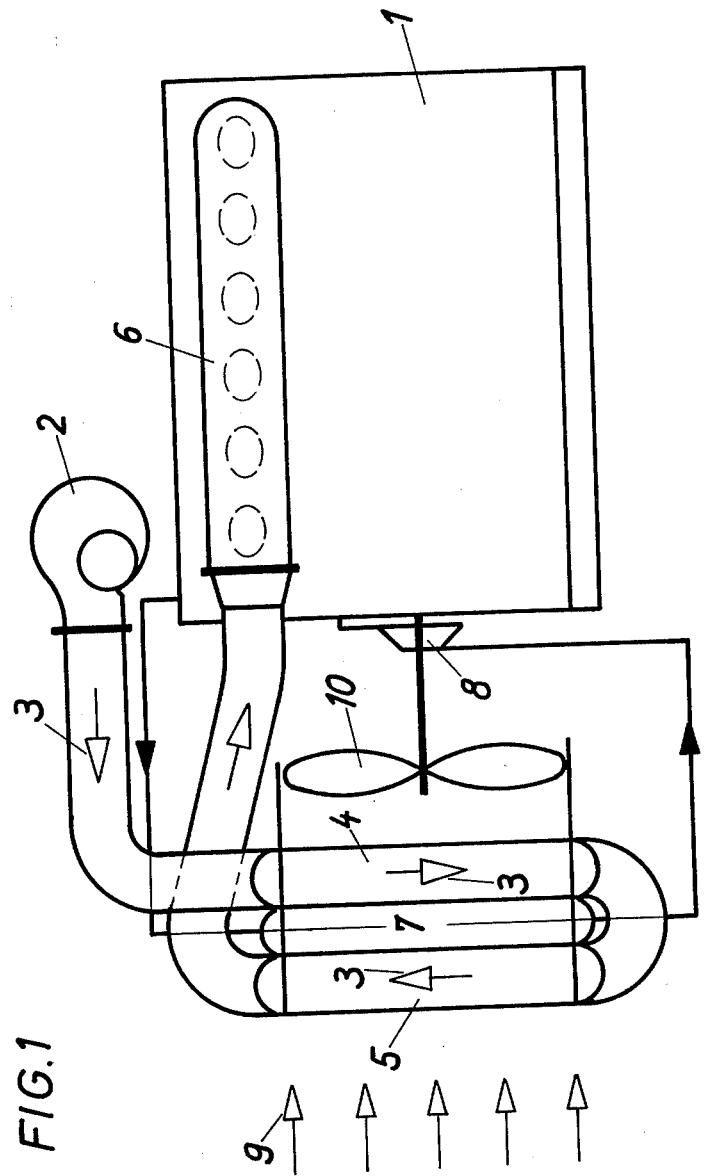
FIG. 1 shows a water cooled internal combustion engine having two air cooled supercharger intercoolers.

Pursuant to the present invention, an internal combustion engine of the above mentioned general type is characterized primarily by several supercharger intercoolers or cooling systems respectively having different temperature levels, according to which the individual coolers or radiators are arranged in succession in the direction of flow, with the charged air decreasing in temperature and the cooling air increasing in temperature.

With the arrangement of the supercharger intercoolers pursuant to the present invention, a portion of the quantity of heat is carried off at a high temperature level, and a portion of the quantity of heat is carried off at a low temperature level. In this way, the temperature difference between the cooling air and the charged air can be better utilized, as a result of which the size of the radiators as well as the required ventilator power are reduced.

According to one specific embodiment of the present invention, the supercharger intercoolers, depending on their number and temperature level, are arranged in front of and/or behind a liquid radiator for the internal combustion engine. The liquid radiator can, for example, be a water or oil radiator.

Pursuant to a further embodiment of the present invention, one or more liquid cooled supercharger intercoolers with different temperature levels are arranged in the direction of flow of the charged air ahead of an air cooled supercharger intercooler. The air cooled heat exchangers of the supercharger intercoolers are located in the cooling air stream of the internal combustion engine behind the air cooled supercharger intercooler. Due to the compact construction of the liquid radiator, the overall volume is further decreased. Moreover, the conduits for the cooling liquid require considerably less cross sectional area, so that the liquid cooled supercharger intercoolers can be mounted directly on the internal combustion engine, while the heat exchanger for the liquid cooling medium can be easily arranged at any suitable place.

A further simplification is achieved if the liquid radiator of the internal combustion engine is simultaneously the heat exchanger of a supercharger intercooler.

If several liquid cooled supercharger intercoolers are used, it is expedient that the liquid radiator of the internal combustion engine be located between the air cooled supercharger intercooler and a heat exchanger of a liquid cooled supercharger intercooler.

The principle of the present invention also applies to internal combustion engines having a supercharger and a liquid cooled supercharger intercooler, when several supercharger intercoolers and heat exchangers form cooling circuits with different temperature levels. In such a case, the heat exchangers are successively arranged in the cooling air stream with respectively increasing temperatures. This arrangement is possible not only with air cooled but also with water cooled internal combustion engines. In this connection, supercharger intercoolers and heat exchangers are formed as one unit having two separate passages for the cooling medium or coolant. With separate circuits, the supercharger intercooler, which is arranged directly on the internal combustion engine, is designed only slightly larger than a normal supercharger intercooler, while both honeycombed radiators for recooling the cooling media are designed correspondingly smaller than a radiator having a simple circuit and uniformly low cooling medium temperature. In addition, the air requirement and ventilator capacity decrease.

In an advantageous manner, pursuant to a specific embodiment of the present invention, lubricating oil can be used as the cooling liquid for the hotter cooling circuit, and cooling water can be used for the cooler cooling circuit.

A favorable arrangement with regard to the temperature level of the heat exchangers is obtained if a liquid radiator of the internal combustion engine is arranged between the heat exchangers for the charged air.

In this connection, in an advantageous manner, the one or more liquid radiators of the internal combustion engine can simultaneously be heat exchangers for corresponding supercharger intercoolers. In order to utilize the supercharger intercooler having a high temperature level, during partial throttle and idling of the internal combustion engine, for efficiently preheating the air for combustion, it is further proposed that one or more supercharger intercoolers which are associated with cooler cooling circuits be provided with bypass lines by means of which the cooling medium may bypass these supercharger intercoolers during partial throttle and idling of the internal combustion engine. The control for this purpose is expediently effected as a function of the fuel feed or of the exhaust gas temperature. By using lubricating oil or cooling water heat, it is possible by means of preheating or cooling to achieve an optimum adaptation of the charging air temperature to the existing operating conditions.

Referring now to the drawings in detail, a water cooled reciprocating piston internal combustion engine 1 is supercharged by means of an exhaust-driven supercharger 2. From the exhaust-driven supercharger 2, the air for combustion, flows or passes in the direction of the arrows 3 through two supercharger intercoolers 4 and 5 and passes from there into the pressure pipe or intake manifold 6. A water radiator 7 of the internal combustion engine 1 is arranged between the supercharger intercoolers 4 and 5.

The cooling water is conveyed through the water radiator 7 by means of a water pump 8. Cooling air conveyed by a ventilator or fan 10 flows transversely past or through the supercharger intercoolers 4 and 5, as well as the water radiator 7, in the direction of the arrows 9. With the selected arrangement, the charged air in the supercharger intercooler 5 is, for example, cooled to an end temperature of approximately 60° C. In so doing, the cooling air is heated up to about 50° C. and subsequently, in the water radiator 7, at a temperature level of about 80°–110° C., absorbs the quantity of heat necessary for cooling the internal combustion engine. The cooling air subsequently serves to precool the charged air in the supercharger intercooler 4. The supercharger intercoolers 4 and 5, in an expedient manner, form a compact unit with the water radiator 7.

Figure 2:
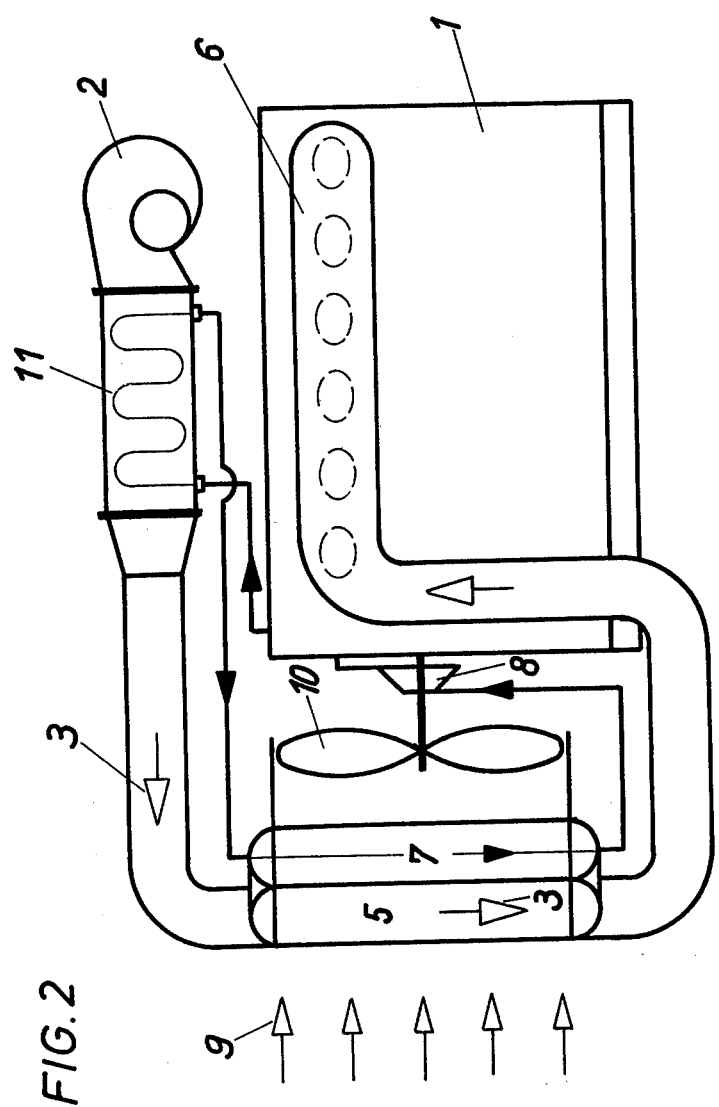
FIG. 2 shows a water cooled internal combustion engine having an air cooled supercharger intercooler and a liquid cooled supercharger intercooler, the heat exchanger of which is the liquid radiator of the internal combustion engine.

In the embodiment of FIG. 2, a liquid cooled supercharger intercooler 11 replaces the air cooled supercharger intercooler 4. The water radiator 7 of the internal combustion engine 1 serves as the heat exchanger for the supercharger intercooler 11.

Figure 3:
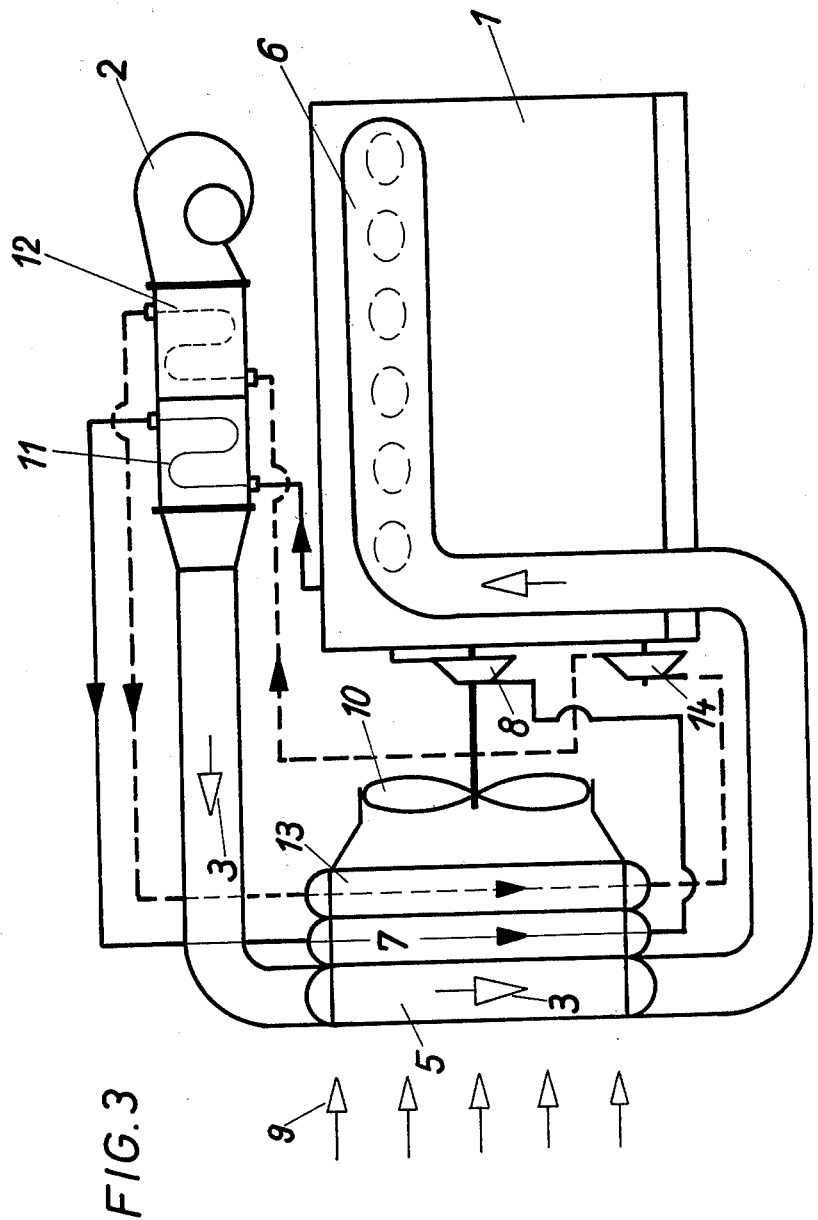
FIG. 3 shows an internal combustion engine similar to that of FIG. 2 having a second liquid cooled supercharger intercooler and heat exchanger.

FIG. 3 shows a second liquid cooled supercharger intercooler 12 which, along with a heat exchanger 13, forms a cooling circuit having a higher temperature level than that of supercharger intercooler 11. The cooling medium or coolant in this circuit is conveyed by an additional pump 14. This cooling medium can, for example, also be the lubricating oil for the internal combustion engine, and the pump 14 can be integrated into the engine lubricating circuit.

Figure 4:
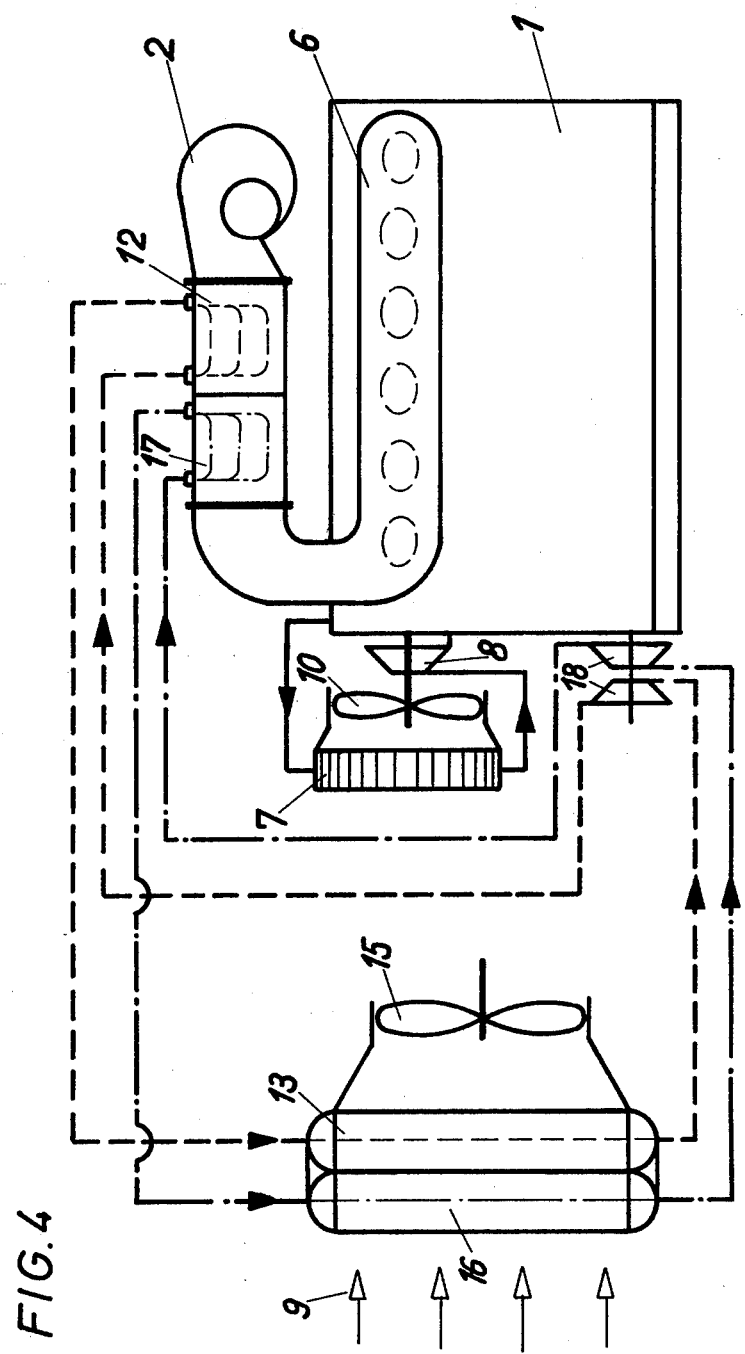
FIG. 4 shows an arrangement having two liquid cooled supercharger intercoolers and corresponding heat exchangers.

FIG. 4 shows a specific embodiment having a separate water radiator 7 and a ventilator or fan 10 for the internal combustion engine 1. An additional ventilator 15 conveys the cooling air through the heat exchangers 13 and 16 of two liquid cooled supercharger intercoolers 12 and 17. The cooling media of both charged air cooling circuits are conveyed by a double pump 18.

Figure 5:
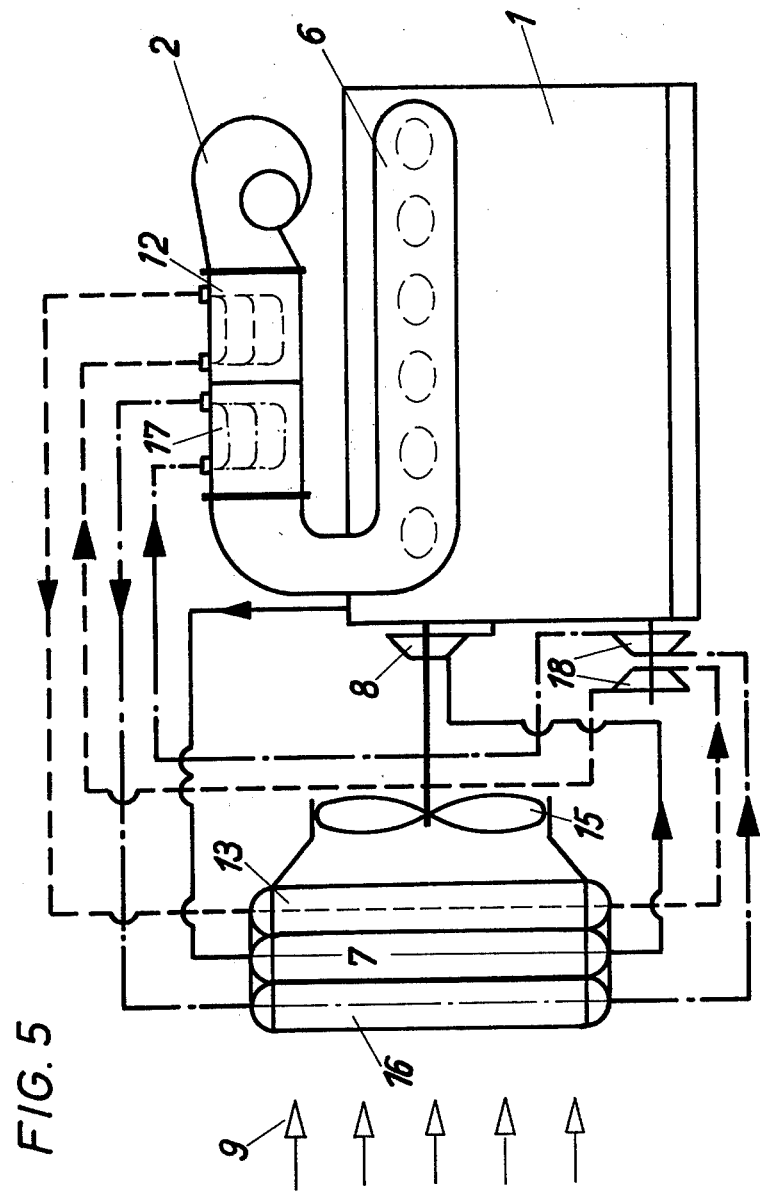
FIG. 5 shows an arrangement similar to that of FIG. 4, with the liquid radiator of the internal combustion engine arranged between the heat exchangers.

In the embodiment of FIG. 5, the water radiator 7 of the internal combustion engine 1 is arranged between the heat exchangers 13 and 16 and forms one unit with them. The ventilator 10 can therefore be eliminated.

Figure 6:
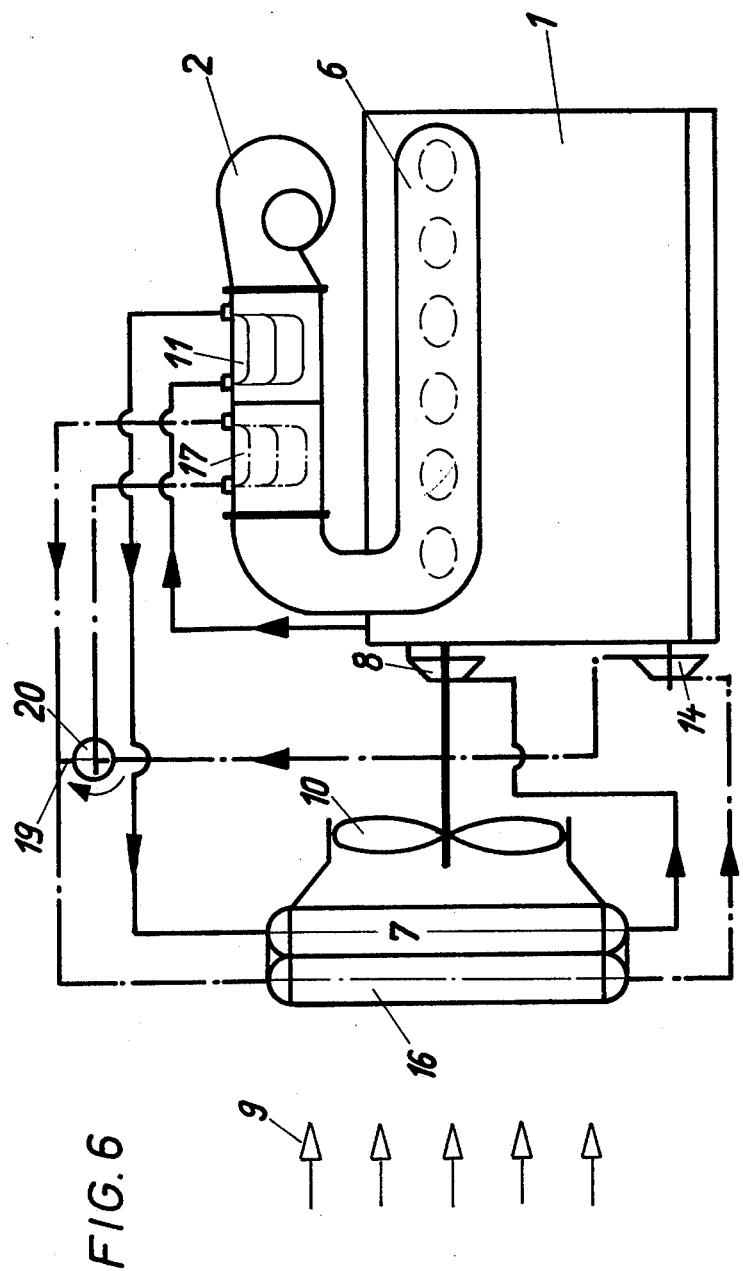
FIG. 6 shows an arrangement similar to that of FIG. 4, with a heat exchanger serving as the liquid radiator of the internal combustion engine, and a bypass line by means of which the cooling medium may bypass the supercharger intercooler.

FIG. 6 shows two supercharger intercoolers 11 and 17 having two heat exchangers 7 and 16, the heat exchanger 7 simultaneously serving as the water radiator for the internal combustion engine 1. The cooling circuit of the supercharger intercooler 17 has a bypass line 19, which is controlled by a switching value 20. In this manner, according to prior art of U.S. Pat. No. 2,372,272-Helmore dated Mar. 27, 1954, it is possible, as a function of the fuel feed or of the exhaust gas temperature, for the cooling medium to bypass the supercharger intercooler 17; accordingly, at partial throttle and during idling, the air for combustion is effectively affected by the supercharger intercooler 11 in conjunction with the heat exchanger 7.

Figure 7:
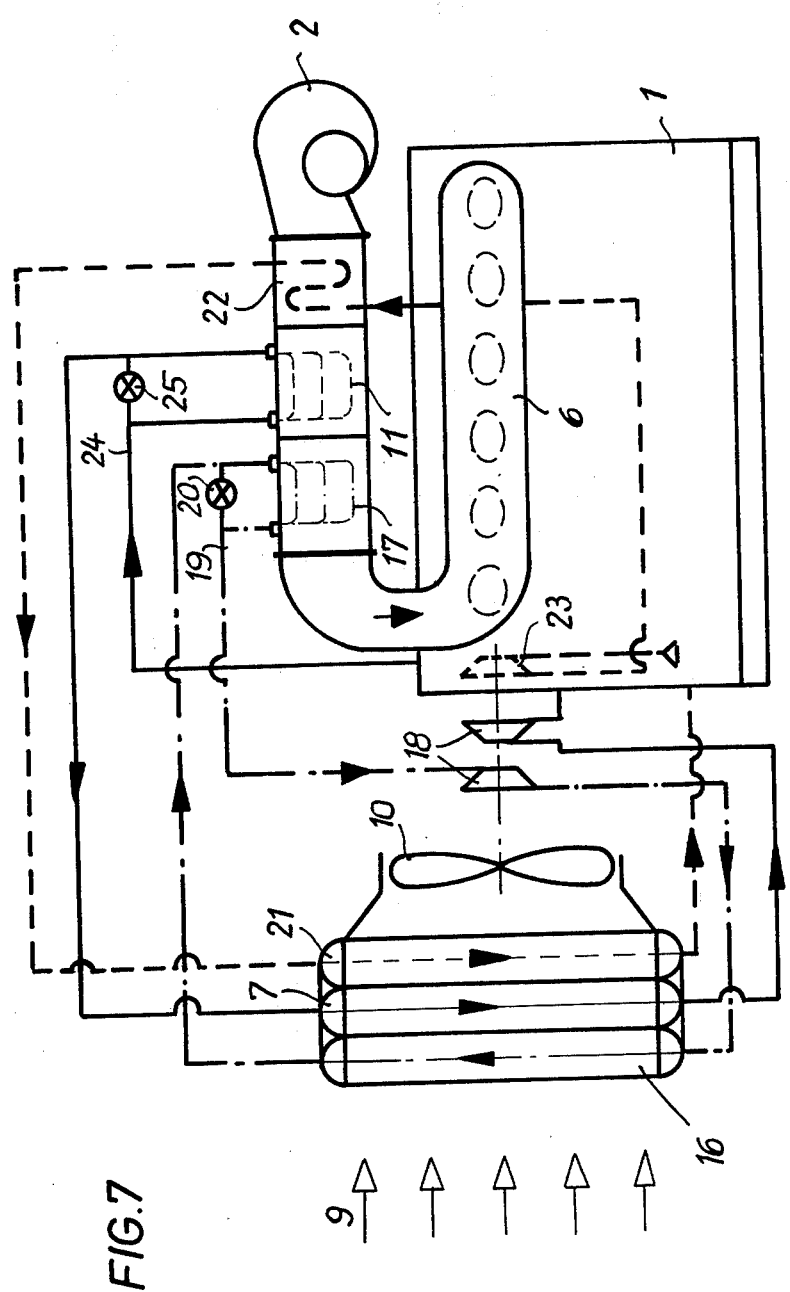
FIG. 7 is an arrangement with three supercharger intercoolers and heat exchangers.

FIG. 7 shows a lubricating oil radiator 21 which is integrated with the remaining heat exchangers 7 and 16 and serves as the heat exchanger for a third supercharger intercooler 22. The lubricating oil is conveyed by a lubricating oil pump 23. With this embodiment, the cooling circuit of the supercharger intercooler 11 also has a bypass line 24, which is controlled by an additional switching valve 25. The arrangement of FIG. 7 allows a very compact construction and further makes possible, by preheating and cooling over a wide range, the adaptation of the charged air temperature to the requirements of achieving an optimal operation of the internal combustion engine.

The foregoing description for FIGS. 6 and 7 can be taken with prior art of U.S. Pat. No. 2,372,272-Helmore dated Mar. 27, 1954 that shows a valve 20 in FIG. 4 thereof controlled dependent upon fuel supply or idling since a lever 18 thereof is connected with a throttle flap of the carburetor and thereby influencing the speed and consequently also the fuel supply. In the prior art of U.S. Pat. No. 2,748,562-Kauffmann dated June 5, 1956 there is disclosed an arrangement for temperature-dependent control of a valve 10 thereof in cooling medium supply 8 to the intermediate cooler 7 thereof.

It is, of course, to be understood that the present invention is in no way limited to the specific showing of the drawings, but also encompasses any modifications within the scope of the appended claims.

What I claim is:

1. An arrangement comprising in combination: an internal combustion engine; a supercharger for supplying charged air to said internal combustion engine; at least two means for cooling said charged air having different temperature levels and being interposed between said supercharger and said internal combustion engine as well as communicating with same and being located in the charged air flow path, said means for cooling charged air comprising an air cooled supercharger intercooler and at least two liquid cooled supercharger intercoolers each having a different temperature level as well as being arranged ahead of said air cooled supercharger intercooler in the direction of charged air flow, and an air cooled heat exchanger operatively connected to said liquid cooled intercoolers and located in the flow of said cooling air from siad air cooled supercharger intercooler; and means for drawing cooling air into said arrangement, said means for cooling charged air being arranged in succession in the stream of said charged air in such a way that the temperature of said charged air decreases in the direction of flow thereof, and the temperature of said cooling air increases in the direction of flow thereof.

2. An arrangement according to claim 1, which includes a liquid radiator operatively connected to said internal combustion engine, and in which said air cooled intercooler, when viewed in the direction of flow of said cooling air, is arranged in front of said liquid radiator.

3. An arrangement according to claim 1, which includes a liquid radiator operatively connected to said internal combustion engine, and in which said air cooled intercooler, when viewed in the direction of flow of said cooling air, is arranged behind said liquid radiator.

4. An arrangement according to claim 1, which includes a liquid radiator operatively connected to said internal combustion engine, and in which said liquid cooled supercharger intercoolers, when viewed in the direction of flow of said cooling air, are arranged in front of and behind said liquid radiator.

5. An arrangement according to claim 1, in which said air cooled heat exchanger is a liquid radiator for said internal combustion engine.

6. An arrangement according to claim 5, which includes at least two liquid cooled supercharger intercoolers and their pertaining heat exchangers, said liquid radiator heat exchanger being located between said air cooled supercharger intercooler and said at least one remaining heat exchanger.

7. An arrangement according to claim 1, in which said means for cooling charged air comprise at least two liquid cooled supercharger intercoolers, each of which is provided with a heat exchanger, each of said liquid cooled supercharger intercoolers along with its pertaining heat exchanger forming cooling circuits with respectively different temperature levels.

8. An arrangement according to claim 7, which includes two cooling circuits and a liquid radiator operatively connected to said internal combustion engine and arranged between the heat exchangers of said cooling circuits.

9. An arrangement according to claim 7, in which lubricating oil is used as cooling medium for the hotter cooling circuit, and cooling water is used as cooling medium for said at least one remaining cooling circuit.

10. An arrangement comprising in combination: an internal combustion engine; a supercharger for supplying charged air to said internal combustion engine; at least two means for cooling said charged air having different temperature levels and being interposed between said supercharger and said internal combustion engine as well as communicating with same and being located in the charged air flow path, said means for cooling charged air comprising an air cooled supercharger intercooler and a liquid cooled supercharger intercooler arranged ahead of said air cooled supercharger intercooler in the direction of charged air flow, and an air cooled heat exchanger operatively connected to said liquid cooled intercooler and located in the flow of said cooling air from said air cooled supercharger intercooler; and means for drawing cooling air into said arrangement, said means for cooling charged air being arranged in succession in the stream of said charged air in such a way that the temperature of said charged air decreases in the direction of flow thereof, and the temperature of said cooling air increases in the direction of flow thereof.

* * * * *

UNITED STATES PATENT AND TRADEMARK OFFICE
CERTIFICATE OF CORRECTION

PATENT NO. : 4236492
DATED : 2 December 1980
INVENTOR(S) : PAUL THOLEN

It is certified that error appears in the above—identified patent and that said Letters Patent is hereby corrected as shown below:

[73] Assignee: Klöckner-Humboldt-Deutz Aktiengesellschaft, Cologne, Fed. Rep. of Germany Signed and Sealed this Third Day of March 1981

[SEAL]

Attest:

RENE D. TEGTMEYER

Attesting Officer     Acting Commissioner of Patents and Trademarks